(12) United States Patent
Osaki

(10) Patent No.: US 8,675,206 B2
(45) Date of Patent: Mar. 18, 2014

(54) MEASUREMENT METHOD FOR MEASURING SHAPE OF TEST SURFACE, MEASUREMENT APPARATUS, AND METHOD FOR MANUFACTURING OPTICAL ELEMENT

(75) Inventor: Yumiko Osaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 13/182,159

(22) Filed: Jul. 13, 2011

(65) Prior Publication Data

US 2012/0013916 A1 Jan. 19, 2012

(30) Foreign Application Priority Data

Jul. 15, 2010 (WO) ................. PCT/JP2010/061940

(51) Int. Cl.
*G01B 11/02* (2006.01)
(52) U.S. Cl.
USPC ............................. 356/511; 356/513; 356/515
(58) Field of Classification Search
USPC ................................................ 356/511–515
See application file for complete search history.

(56) References Cited

U.S. PATENT DOCUMENTS

| 6,956,657 | B2 | 10/2005 | Golini et al. |
| 7,808,617 | B2 * | 10/2010 | Gesner et al. ..................... 356/3 |
| 8,355,140 | B2 * | 1/2013 | Hwang et al. ................. 356/511 |

FOREIGN PATENT DOCUMENTS

| JP | 2-259509 A | 10/1990 |
| JP | 8-240417 A | 9/1996 |
| JP | 2000-287223 A | 10/2000 |
| JP | 2004-286561 A | 10/2004 |
| JP | 2006-250859 A | 9/2006 |
| JP | 2008-510146 A | 4/2008 |
| JP | 2008-224552 A | 9/2008 |
| JP | 2009-244228 A | 10/2009 |

* cited by examiner

*Primary Examiner* — Tarifur Chowdhury
*Assistant Examiner* — Jonathon Cook
(74) *Attorney, Agent, or Firm* — Canon U.S.A., Inc., IP Division

(57) ABSTRACT

Provided is a measurement method or apparatus that can reduce the time for measuring the shape of an entire test surface. Each of a plurality of measurement ranges is set so that one measurement range overlaps a portion of at least another measurement range to form an overlap region, each measurement range being a portion of the test surface. Then, the shape of the test surface is measured at a first resolution in a first measurement range among the plurality of measurement ranges, and is measured at a second resolution in a second measurement range. Pieces of data of the shapes of the test surface in the plurality of measurement ranges are stitched together using the resulting measurement data to calculate the shape of the test surface.

17 Claims, 20 Drawing Sheets

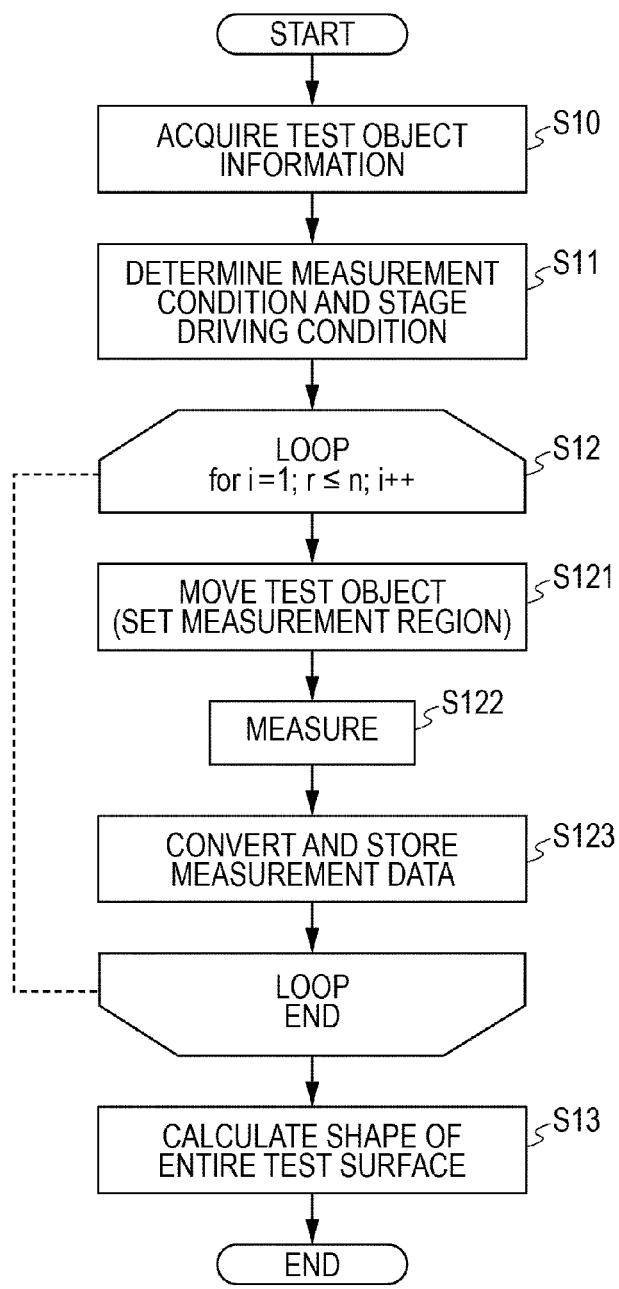

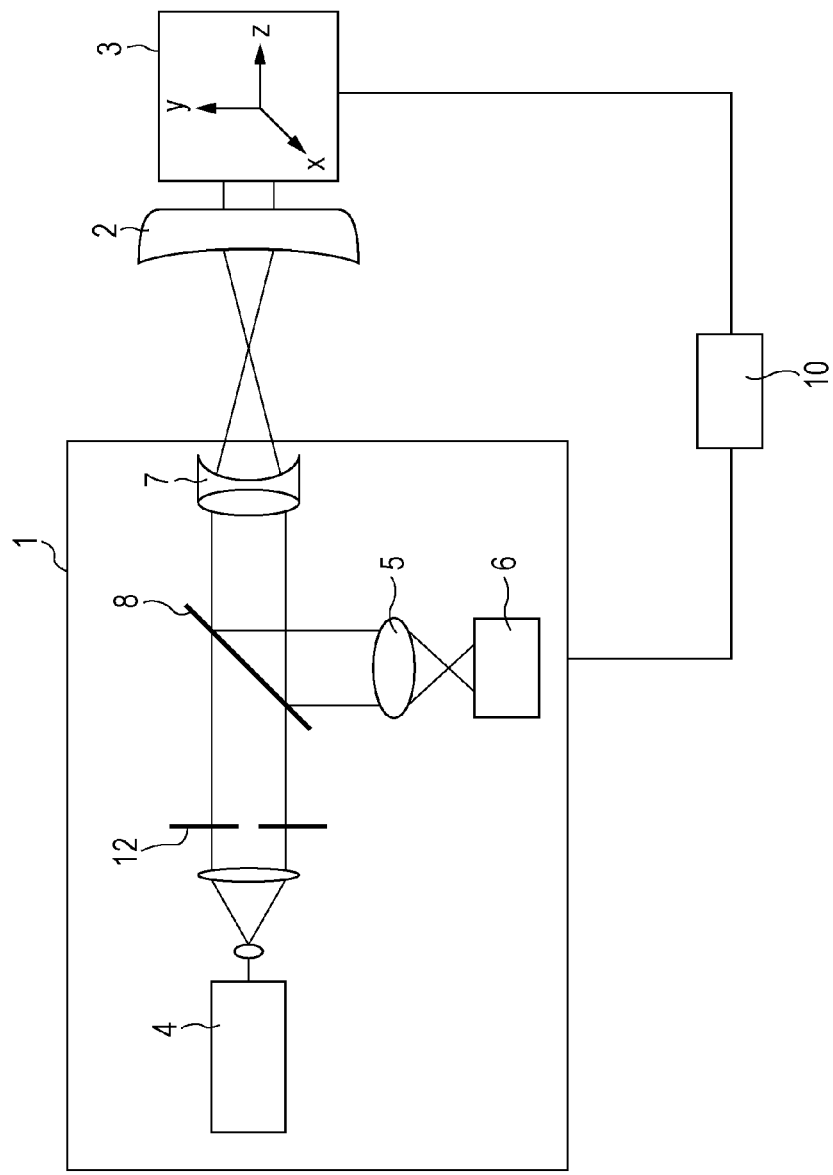

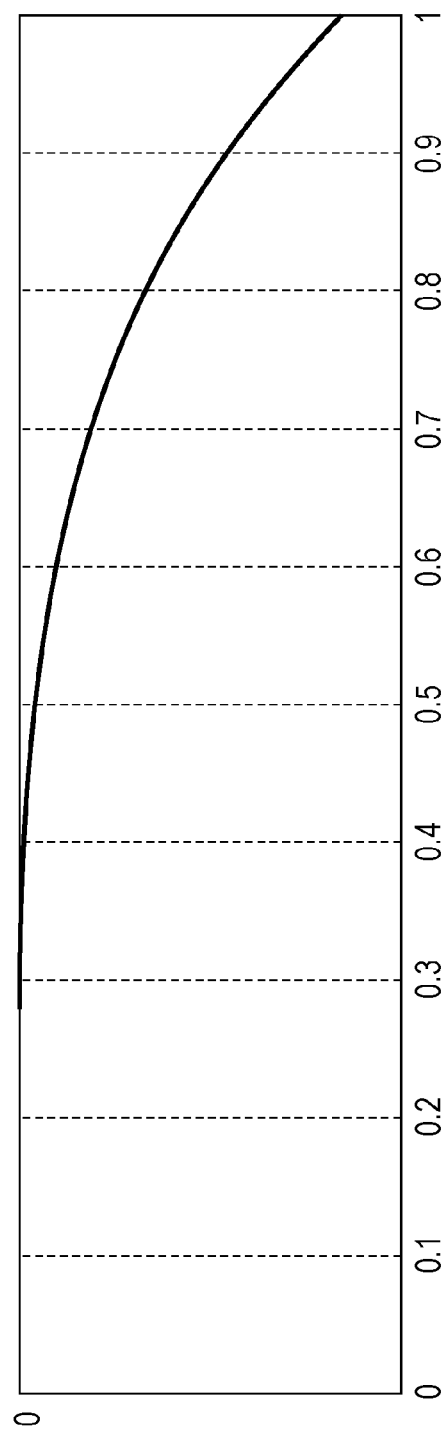

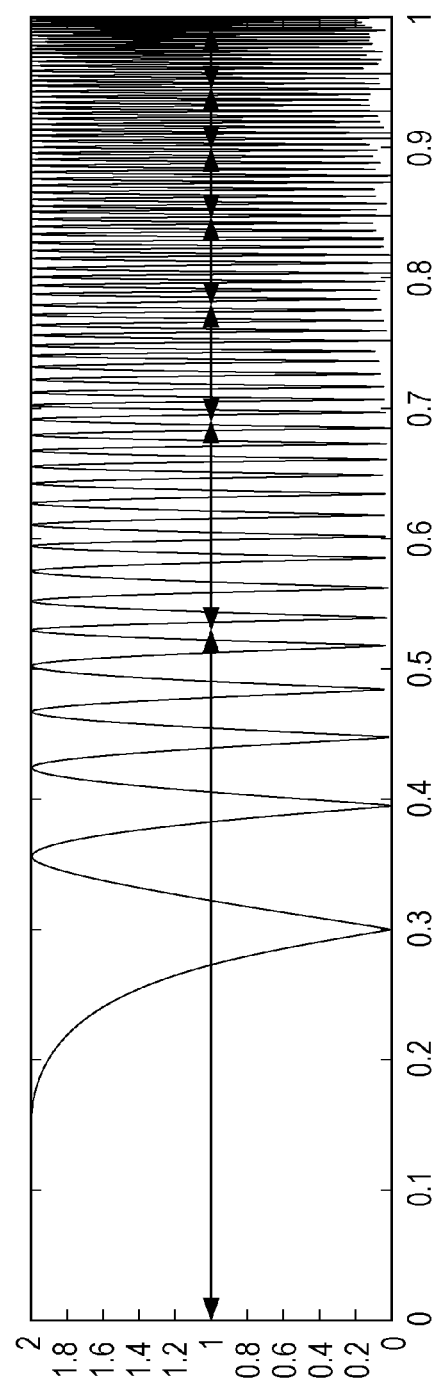

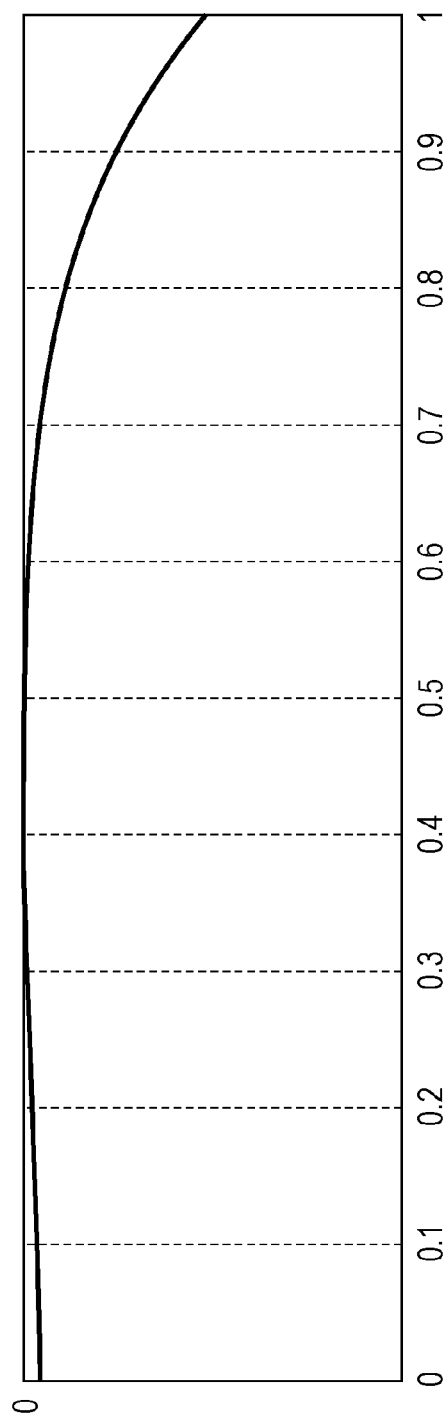

MEASUREMENT METHOD FOR MEASURING SHAPE OF TEST SURFACE, MEASUREMENT APPARATUS, AND METHOD FOR MANUFACTURING OPTICAL ELEMENT

TECHNICAL FIELD

The present invention relates to a measurement method for measuring the shape of a test surface, a measurement apparatus, and a method for manufacturing an optical element.

BACKGROUND ART

Lenses with a large aperture diameter that is more than a diameter of 200 mm are used in high-magnification zoom lenses. In order to measure the surface shape of such lenses or the wavefront of light from the lenses, an interferometer with a large aperture diameter, as a measurement apparatus, and a reference lens used in the interferometer are necessary. Since the reference lens needs to be larger than the lens to be measured and also needs to have a surface processed with high accuracy, it is difficult to manufacture the reference lens, and much cost and time are required.

Thus, a technique for measuring a test surface using a plurality of smaller measurement ranges has been used (see PTL 1). This method computes data of the shape of an entire test surface by acquiring data of the shape of a portion of the test surface for each measurement range and performing an arithmetic process (stitching) for stitching together the respective shapes. Accordingly, a compact and low-cost reference lens and measurement apparatus are achieved.

It is disclosed in PTL 1 that all the measurement ranges (sub-apertures) of the test surface have the same dimensions. It is also disclosed that an aspherical surface is measured by selecting a reference lens in accordance with a measurement range necessary to measure a region having the largest amount of asphericity (departure from vertex sphere) in the test surface and by determining each measurement range.

CITATION LIST

Patent Literature

PTL 1: U.S. Pat. No. 6956657

In the measurement technique disclosed in PTL 1, in a region having a large amount of asphericity, the pitch of interference fringes between the test wavefront and the reference wavefront with respect to the region is small. In a region having a small amount of asphericity, on the other hand, the pitch of the interference fringes is large. In addition, the resolution of a sensor that detects the interference fringes is fixed. Thus, all the measurement ranges are set to have uniform dimensions in accordance with a measurement range necessary to measure the region having the largest amount of asphericity in the test surface so that the interference fringes in the region having the largest amount of asphericity in the test surface can be detected with sufficient accuracy.

Therefore, the measurement for a region having a small amount of asphericity is not performed under optimum conditions.

Specifically, if a portion of the test surface has a region with a large amount of asphericity, a region with a small amount of asphericity has measurement ranges that are smaller than necessary and the size of data obtained through measurement is larger than necessary. In the measurement method described in PTL 1, therefore, small measurement ranges increase the number of times measurement is to be performed, and the large size of the measurement data increases the time required for the arithmetic process for stitching. That is, there has been a problem in that the measurement time of the shape of an entire test surface becomes long.

SUMMARY OF INVENTION

According to an aspect of the present invention, a measurement method and measurement apparatus are provided that can reduce the time for measuring the shape of an entire test surface.

According to another aspect of the present invention, the measurement method includes a step of setting each of a plurality of measurement ranges so that one measurement range overlaps a portion of at least another measurement range to form an overlap region, each measurement range being a portion of a test surface; a step of measuring a shape of the test surface in each of the plurality of measurement ranges; and a step of obtaining a shape of the test surface over the plurality of measurement ranges by stitching together pieces of data of the shapes of the test surface obtained in the measuring step, wherein the measuring step includes a step of measuring a shape of the test surface in a first measurement range among the plurality of measurement ranges at a first resolution, and a step of measuring a shape of the test surface in a second measurement range different from the first measurement range among the plurality of measurement ranges at a second resolution different from the first resolution.

According to the present invention, the time for measuring the shape of an entire test surface can be reduced.

Further features of the present invention will become apparent from the following description of exemplary embodiments with reference to the attached drawings.

BRIEF DESCRIPTION OF DRAWINGS

FIG. 2 is a flowchart of a measurement method.
FIG. 7 is a diagram illustrating a configuration for changing the dimensions of a measurement range.
FIG. 9B is a diagram explaining the shape of a test surface and interference fringes.
FIG. 9C is a diagram explaining the shape of a test surface and interference fringes.
FIG. 11B is a diagram explaining the shape of a test surface and interference fringes.

DESCRIPTION OF EMBODIMENTS (Embodiments)

Figure 1:
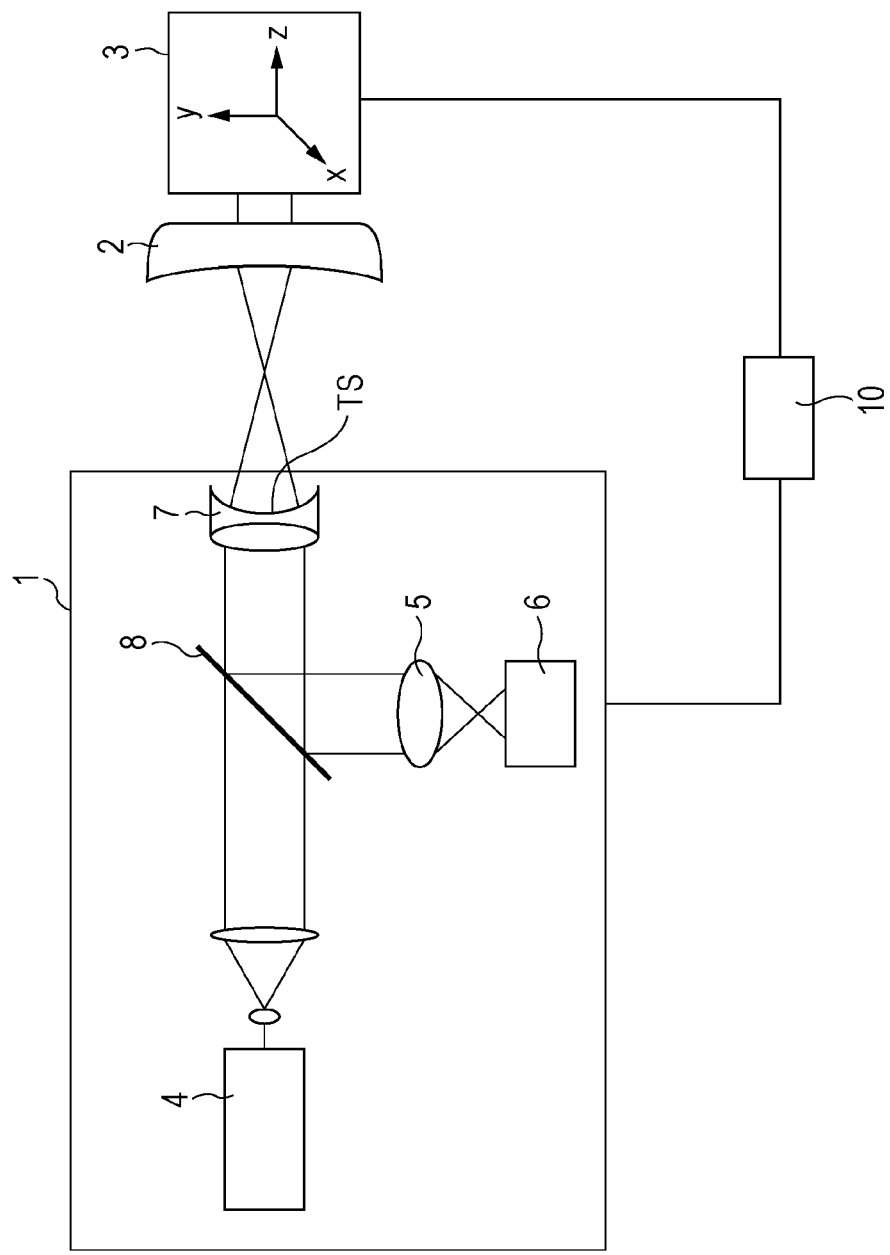
FIG. 1 is a schematic view of a measurement apparatus according to Embodiment 1.

FIG. 1 illustrates a measurement apparatus that measures the shape of a test surface. The measurement apparatus includes an interferometer 1, a stage 3 that supports a test object 2, and a control unit 10 that controls the interferometer 1 and the stage 3. An interferometer is an apparatus (measurement unit) that causes the reference wavefront and the test wavefront to interfere with each other and that measures interference fringes. The interferometer 1 illustrated in FIG. 1 is a Fizeau interferometer. The test object 2 is supported by the stage 3, and is made to move in the x, y, and z directions or to rotate about the x, y, and z axes.

The interferometer 1 mainly includes a laser (light source) 4, a lens 5, a sensor 6, a TS lens 7, and a beam splitter 8. Light emitted from the laser 4 is collimated by a lens, and enters the TS lens 7 through the beam splitter 8. The TS lens 7 splits the light from the laser 4 into reflected light and transmitted light on a surface TS (reference surface) that is on the side opposite the laser 4. The light reflected by the surface TS becomes a reference wavefront. The reference wavefront is reflected by the beam splitter 8, and reaches the sensor 6 through the lens 5. On the other hand, the light transmitted through the surface TS is reflected by the test object 2, and becomes a wavefront (test wavefront) having information regarding the test surface of the test object 2. After being transmitted through the TS lens 7, the test wavefront is reflected by the beam splitter 8, and enters the sensor 6 through the lens 5. The reference wavefront reflected by the surface TS and the test wavefront reflected by the test surface through the surface TS interfere with each other, and interference fringes are formed on a light receiving surface of the sensor 6. The sensor 6 captures an image of the interference fringes. Examples of the sensor 6 include an image pickup element such as a CCD or CMOS element. The test object 2 illustrated in FIG. 1 is a concave lens. However, the test object 2 may be a convex lens, in which case measurement can be performed by arranging the convex lens between the TS lens 7 and a condensing point thereof.

The stage 3 has at least an xyz stage, and allows a test object to move in the x, y, and z directions. An xyz stage may be sufficient for a test object whose test surface is planar. For a spherical or aspherical test surface, a six-axis stage including, in addition to an xyz stage, a rotation mechanism about the x axis, a rotation mechanism about the y axis, and a rotation mechanism about the z axis is preferable. However, if it is difficult to produce a six-axis stage, a five-axis stage including one of a rotation mechanism about the x axis and a rotation mechanism about the y axis may be used.

The control unit 10 is electrically connected to the interferometer 1 and the stage 3, and obtains a signal from the sensor 6 or outputs a control signal to the stage 3. Further, the control unit 10 includes a storage device (storage unit) that stores measurement data, and an arithmetic processing device (calculation unit) that performs a stitching process using the measurement data to calculate the shape of a test surface.

Next, a measurement method will be described. FIG. 2 illustrates a flowchart of measurement. First, information regarding a test object is acquired (S10). The information regarding the test object is, for example, a convex lens, a concave lens, a spherical surface, an aspherical surface, or the like. Then, measurement conditions and driving conditions of the stage 3 are determined on the basis of the information regarding the test object (S11). The measurement conditions are the selection of a TS lens, the resolution during measurement, the number of division into which the test surface is divided by a plurality of measurement ranges, the dimensions of each measurement range (measurement region), and the like. The driving conditions of the stage are determined using the resolution during measurement, the number of divisions, measurement ranges, and the like.

Figure 3A:
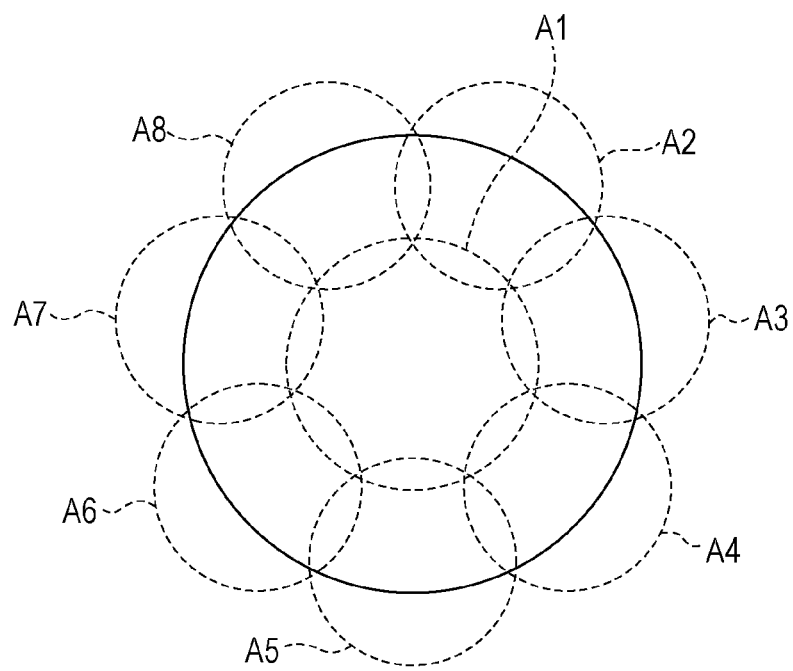
FIG. 3A is a diagram illustrating measurement ranges.

Measurement ranges of a test surface will be described with reference to FIG. 3A. The thick line illustrated in FIG. 3A represents the outer periphery of the test surface, and dotted line circles A1 to A8 represent respective measurement ranges. In this example, the test surface is divided into eight measurement ranges and is measured. Each of A1 to A8 partially overlaps at least another measurement range, and an overlap region is formed. For example, A2 partially overlaps A1, A3, and A8. The region (area or diameter) of A1 is larger than the regions of A2 to A8. That is, the entire test surface is separated into two groups, i.e., a center portion, A1 (first measurement range), and peripheral portions, A2 to 8 (second measurement range).

Then, measurement is performed in each measurement range (S12). Here, the number of division is set to n=8 and measurement is started with i=1. First, the control unit 10 sends a drive signal to the stage 3 so that the region A1 can be measured, and the stage 3 causes the test object 2 to move or rotate (S121). Then, measurement is performed in the region A1 (S122). The test wavefront from the region A1 and the reference wavefront interfere with each other and interference fringes are formed on the light receiving surface of the sensor 6. Thus, the control unit 10 sends a data acquisition command signal to the sensor 6, and the sensor 6 captures an image of the interference fringes. Then, captured image data is transmitted from the sensor 6 to the control unit 10.

The control unit 10 calculates the wavefront of light from the test surface using the captured image data (measurement data) having information regarding the interference fringes, and converts the wavefront into the shape of the test surface. Then, the control unit 10 causes a storage unit such as a memory to store measurement data of the shape of the test surface for the region A1 so that the measurement data can be temporarily saved (S123). A phase shift method, and an FFT method, and the like are available as methods for converting interference fringes into the shape of the test surface. Here, position information regarding the stage may also be stored in association in the memory.

Next, measurement for the region A2 is performed with i=2. In order to measure the region A2, the interference fringes are measured after the stage 3 causes the test object 2 to move. Then, the captured image data is transmitted from the sensor 6 to the control unit 10 so that the control unit 10 converts the captured image data into the shape of the test surface in the region A2, and measurement data of the shape of the test surface in the region A2 is stored in the memory.

Next, measurement for the regions A3 to A8 is repeatedly performed in a manner similar to the region A2, and measurement data of the shape of the test surface for the regions A3 to A8 is stored in the memory. Then, the control unit 10 reads the data of the shape of the test surface in the regions A1 to A8 from the memory, and performs a data processing operation (stitching process) for stitching together the shapes of the test surface for the regions A1 to A8 using the above pieces of data to compute the shape of the entire test surface (S13). The step of converting the measurement data of the interference fringes into data of the shape of the test surface may be performed all together after the end of the respective measurements for A1 to A8. The control unit 10 executes a program for performing the processing of S123 and S13, thereby calculating the wavefront of light from the test surface or the shape of the test surface. However, instead of the control unit 10, an external information processing apparatus may execute the above program.

In this embodiment, measurement is performed using two resolutions. Specifically, measurement is performed for the region of A1 using a first resolution, and measurement is performed for the regions of A2 to 8 using a second resolution different from the first resolution. The term resolution is the number of measurement points (the number of pieces of data) per unit length of the test surface. In this embodiment, photographing is performed using a sensor having a unique number of pixels, and the resolution is changed by making the region of A1 larger than the regions of A2 to A8 while making the diameters of light fluxes (beams) projected onto the sensor constant. Since the diameters of light fluxes projected onto the sensor are made constant, the number of pixels used for photographing is constant. However, since the region A1 is larger, the number of measurement points per unit length of the test surface is reduced, and the region A1 has a lower resolution.

Changing the resolution between the center portion A1 and the peripheral portions A2 to A8 is based on the following reasons. For example, it is assumed that the test object is a lens having an aspherical shape with rotational symmetry and that the central portion A1 has a different amount of asphericity from the peripheral portions A2 to A8 while all the peripheral portions A2 to 8 have an equal amount of asphericity. If the peripheral portions have a larger amount of asphericity than the central portion, the interval of the interference fringes to be measured is smaller in the peripheral portions. Because the small interval of the interference fringes requires more accurate photographing of the interference fringes, high-resolution measurement is needed. That is, high-resolution measurement is performed for the peripheral portions where the interval of the interference fringes is small, and low-resolution measurement may be sufficient for the central portion where the interval of the interference fringes is large. No need exists to reduce the measurement accuracy. In this manner, in the case of divisional measurement of small sub-regions of the entire test surface, it may be most effective that measurement be performed at optimum resolutions in accordance with the interval of the interference fringes within a measurement range.

Next, a method for calculating the shape of the entire test surface using data of the shape of the test surface in the regions of A1 to A8 will be described. Data of the shape of the test surface in the regions A1 to A8, which have been obtained by converting measurement data, are represented by $\Phi'1$ to $\Phi'8$.

$$A1: \Phi'_1 = \Phi_1 + \text{Set}(1) + \text{Sys1}$$
$$A2: \Phi'_2 = \Phi_2 + \text{Set}(2) + \text{Sys2}$$
$$\ldots$$
$$A8: \Phi'_8 = \Phi_8 + \text{Set}(8) + \text{Sys2}$$

(Equation 1)

-continued $\Phi'_i$: data of shape of test surface in $Ai$ region $\Phi_i$: true shape of test surface in $Ai$ region $$\text{Set}(i) = \sum_{j=1}^{3} a_j^n Z_j:$$

setting error caused by measurement of $Ai$ region $$\text{Sys1} = \sum_{j=4}^{\infty} b1_j Z_j:$$

system error caused by measurement at first resolution $$\text{Sys2} = \sum_{j=4}^{\infty} b2_j Z_j:$$

system error caused by measurement performed at second resolution $a_j^n$, $b1_j$, and $b2_j$ are coefficients As given in Equation 1, the data $\Phi'$ represents a numerical value obtained by adding a setting error and a system error (measurement error) to the true shape $\Phi$ of the test surface in each region. By way of example, these error components are defined using the Zernike function, assuming the setting error in the Z1 to Z3 terms and the system error in the Z4 and subsequent terms. The setting error is assumed to be an error caused by the setting of an interferometer, and different values are obtained by measurement performed eight times. On the other hand, the system error is assumed to be an error (optical characteristic error) that is determined from the characteristics of the optical system, such as the aberration of the interferometer, and the system error is basically set to a constant value under the same measurement conditions. However, if measurement for A1 and measurement for A2 to A8 are performed at different resolutions, different system errors are obtained. On the basis of this assumption, the representation as given in Equation 1 may be needed.

The coefficients of the above setting error and system error are calculated using the optimization method or the like so that the value of $\Delta$ given in Equation 2 can be minimized. That is, the coefficients (a, b) of the above setting error and system error are calculated so that the sum of squares of a residue of the shapes ($\Phi_A$ and $\Phi_B$) of the test surface in a portion (overlap region) where a plurality of measurement ranges overlap can be minimized. Then, the test surface shape in each measurement range is computed by substituting the coefficients of the setting error and the system error into Equation 1 and by removing the setting error and the system error from the measurement data of the test surface shape in each measurement range. Then, the computed test surface shapes are stitched together to calculate the shape of the entire test object.

$$\Delta = \sum_{A=1}^{n} \sum_{B=1}^{n} \sum_{A \cap B} (\Phi_A - \Phi_B)^2 \quad \text{(Equation 2)}$$

$A \cap B$: overlap region of region $A$ and region $B$

Since the region A1 and the regions A2 to A8 illustrated in FIG. 3A are measured at different resolutions, measurement points on the test surface are different in the overlap regions of the region A1 and the regions A2 to A8. However, the calculation of a system error and a setting error using the optimization method described above requires matching of the measurement points. Therefore, for example, a data interpolation process may be performed on the data of the test surface shape measured at high resolution or on the measurement data to determine rough measurement points for high-resolution measurement so that the measurement points can as match measurement points for low-resolution measurement. Alternatively, measurement points corresponding to a frequency necessary for measurement data may be determined in advance, and a data interpolation process may be performed on all the pieces of shape data or measurement data at a low resolution and a high resolution so that data of the measurement points can be obtained.

Besides the method for calculating a setting error and a system error using the optimization method, a system error may be measured separately and acquired in advance, and the shape of the test surface may be calculated using the system error. However, as in this embodiment, measurement with two different resolutions requires to measure at least two types of system errors corresponding to the respective resolutions.

After the measurement errors of the setting error and the system error are determined, each of the measurement errors is subtracted from the shape data $\Phi'$ of the test surface in each region using Equation 1 to calculate the true shape $\Phi$ of the test surface in each region of the test surface. In the overlap regions, measurement data corresponding to the number of regions including the overlap regions is obtained. Therefore, for example, the average value of pieces of data corresponding to the number of regions including the overlap regions may be determined. In the overlap regions, the averaging effect would reduce random noise or errors of reproducibility or the like of the measurement device, or can reduce differences in level between stitched together portions. Data processing for removing differences in level between the overlap regions and other regions may be performed if necessary.

A method for removing a difference in level will be described. A function for each measurement range is represented by $f_i$, where 1 represents a region where data exists and 0 represents a region where no data exists. F obtained by adding together $f_i$ is defined as in Equation 3.

$$F(x, y) = \sum_{i=1}^{N} f_i(x - x_i, y - y_i) \qquad \text{(Equation 3)}$$

For example, a region with F=2 means that data sets of shapes of the test surface in two measurement ranges overlap, and a region with F=3 means that data sets of shapes of the test surface in three ranges overlap. Thus, F(x, y) is differentiated (Laplacian), thus allowing detection of boundaries (differences in level) between the respective measurement ranges. Then, data of a region where a boundary has been detected is deleted, and data of the region is interpolated. Thereby, the difference in level can be removed.

Next, a means (configuration) for changing the dimensions of a measurement range in this embodiment will be described.

Figure 4:
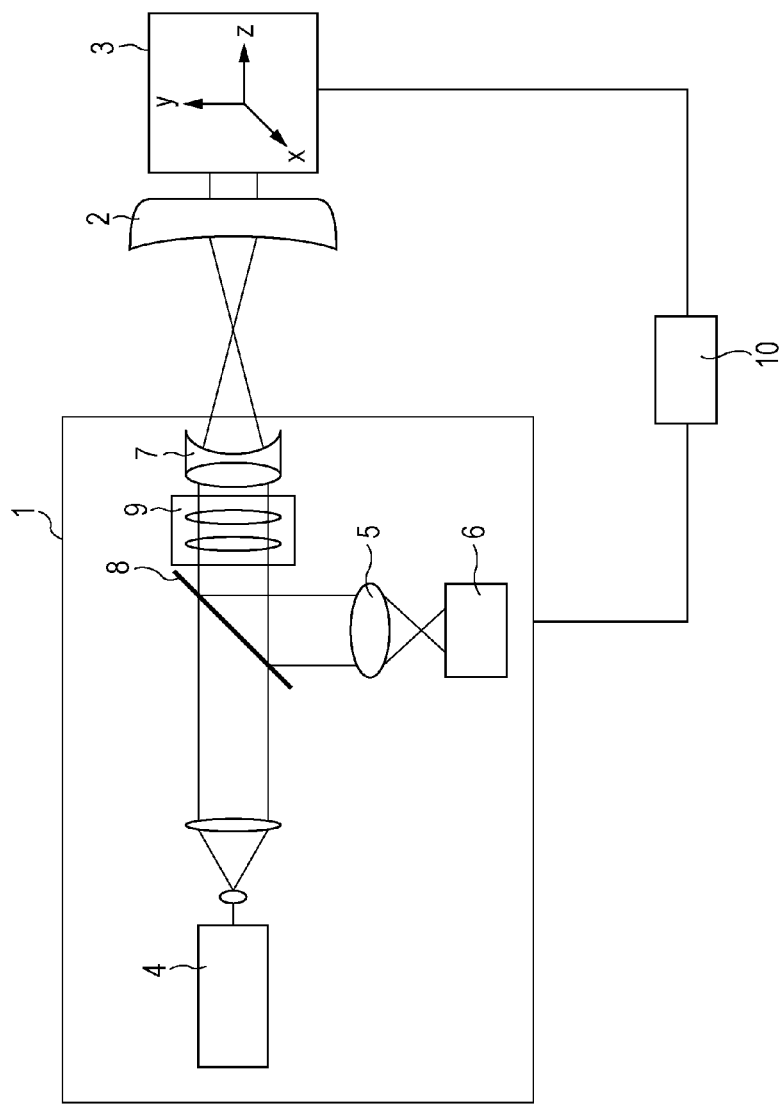
FIG. 4 is a diagram illustrating a configuration for changing the dimensions of a measurement range.

As an example, as illustrated in FIG. 4, an optical system (optical member) 9 capable of changing a magnification is arranged in the interferometer 1. The optical system 9 is arranged on the light source side with respect to the TS lens 7, and is capable of changing the condensing position of the light transmitted through the TS lens 7. Thus, the optical system 9 is capable of changing the diameter of a light flux on the test surface, that is, capable of changing a measurement range. In this regard, the lens 5 is arranged at an appropriate position so that the diameter of the light flux on the light receiving surface of the image pickup element can always be made constant even if a measurement range is changed (this similarly applies to the following examples).

The change in the condensing position of the light transmitted through the TS lens 7 is also referred to as the change in the NA of a light flux or the change in magnification. A magnification-variable optical system may also be configured to include the TS lens 7.

As a second example, an optical system capable of changing the diameter of a light flux is employed as the optical system 9. Examples of the optical system 9 include a magnifying optical system, a reducing optical system, and a beam expander. The diameter of a light flux on the test surface, that is, a measurement range, can be changed by increasing or decreasing the diameter of a light flux of light emitted from the laser 4.

Figure 5:
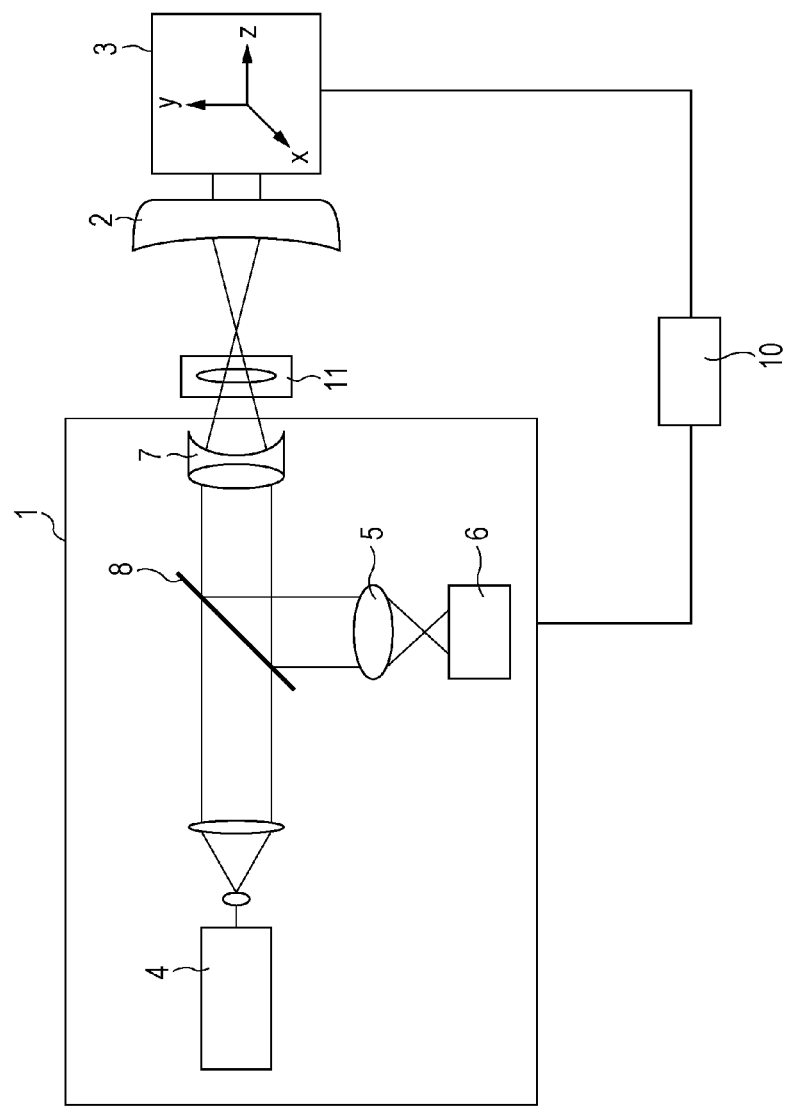
FIG. 5 is a diagram illustrating a configuration for changing the dimensions of a measurement range.

In a third example, as illustrated in FIG. 5, an optical system 11 capable of changing the numerical aperture (NA) of a light flux is arranged between the TS lens 7 and the test object. The optical system 11 is capable of changing the condensing position of light transmitted through the TS lens 7 and the optical system 11, and is therefore capable of changing a measurement range on the test surface in a manner similar to that in the first example.

Figure 6:
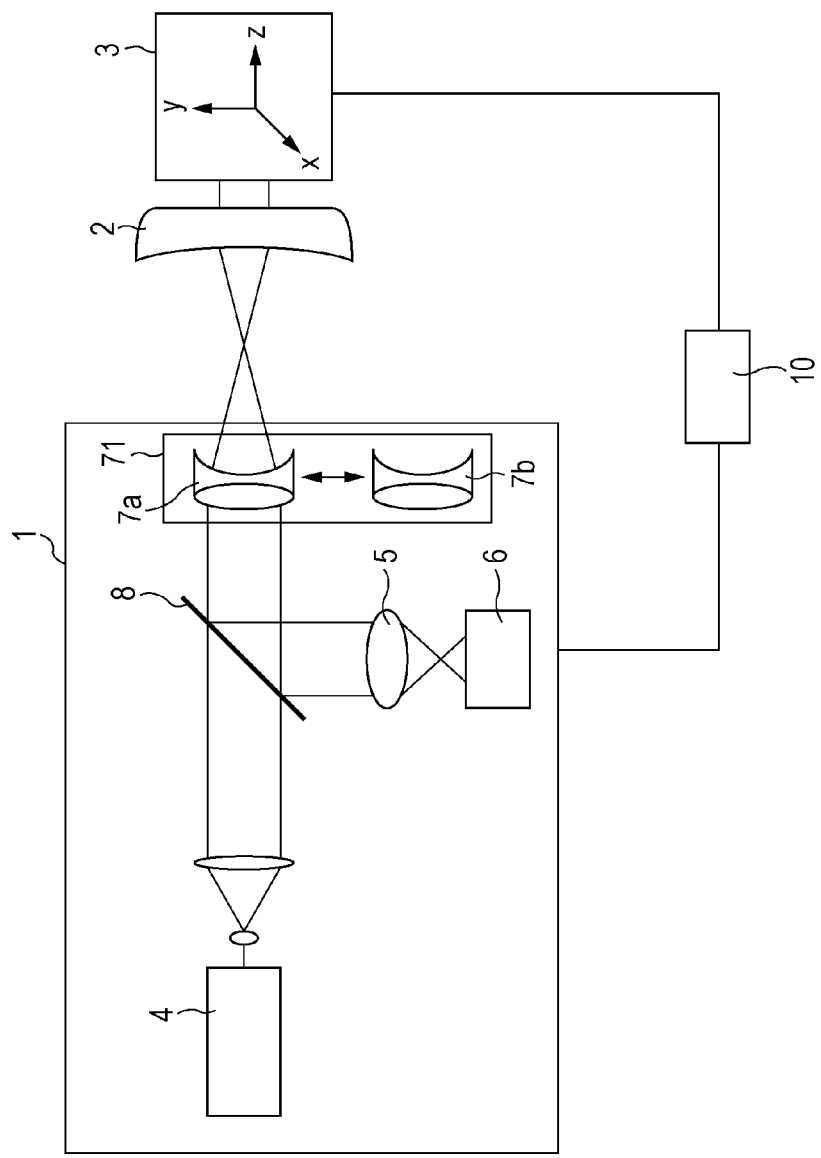
FIG. 6 is a diagram illustrating a configuration for changing the dimensions of a measurement range.

A fourth example is, as illustrated in FIG. 6, an optical system that has different TS lenses 7a and 7b and that switches between them and arranges one of them in an optical path. A switching mechanism 71 switches between the TS lens 7a and the TS lens 7b, and inserts one of them in a light flux. The TS lenses 7a and 7b have different curvatures of TS surface, different F numbers, different magnifications, or the combination thereof. Thus, reference spherical surfaces generated by the TS lenses 7a and 7b are different. The number of switchable TS lenses is not limited to two, and any number of switchable TS lenses may be used.

In a fifth example, as illustrated in FIG. 7, a variable aperture stop 12 capable of changing the diameter of an outgoing light flux is provided. The variable aperture stop 12, which is composed of a light-shielding member, is capable of changing the diameter of an aperture and is therefore capable of changing the diameter of a light flux propagating through the aperture by shielding a portion of an incoming light flux. Therefore, a measurement range can be changed. In place of a variable aperture stop, a plurality of aperture stops having apertures whose diameters are fixed and whose diameters are different may be arranged on a turret, and one of them may be inserted in an optical path after switching between them.

A sixth example is a configuration in which the test object is driven in the center axis (optical axis) direction of light emitted from the interferometer 1. The test object is driven in the above manner, thus allowing the diameter of a light flux falling onto the test surface, that is, a measurement range, to be changed. However, the pitch of the interference fringes formed on the light receiving surface of the sensor varies in accordance with the movement of the test object in the optical axis direction. It is therefore necessary to adjust the resolution of the sensor in terms of the sampling theorem. Alternatively, the position or the like of the optical system located in front of the sensor may be optimized.

In the first to fifth examples described above, the lens 5 is arranged at an appropriate position using a mechanism that causes the lens 5 to move in the optical axis direction so that the diameter of the light flux on the light receiving surface of the image pickup element can always be made constant even if a measurement range is changed.

While several examples have been illustrated, these are not exhaustive, and a configuration having the combination thereof or any other configuration may be used as a means for changing a measurement range.

In any of the above examples, if a measurement range is changed, the aberration of an interferometer, that is, a system error, changes. Therefore, as given in Equation 1, it is necessary to optimize a measurement error on the basis of the assumption that if a measurement range is different, a system error is different. Alternatively, as another method, a known apparatus configuration capable of measuring a system error in advance may be used to measure a system error corresponding to each measurement range in advance, and correction may be performed using the measurement results. For example, a system error is measured in advance using an apparatus that measures, as a system error, the aberration of an optical system forming an interferometer.

Furthermore, particularly, if the test surface has an aspherical shape, a difference between system errors caused by measurement positions may be measured separately in advance. For example, even if the regions A2 and A3 in FIG. 3A have the same dimensions, system errors during the measurement of A2 and A3 are measured. Therefore, system errors having more accurate values can be obtained, and the shape of the test surface can be calculated more accurately.

Next, a method for determining a resolution and the dimensions of a measurement range will be described. These are determined in accordance with the shape of the test surface. First, information regarding the shape of the test surface is acquired. For example, a design value may be used. In general, an aspherical coefficient is available as a design value. An aspherical shape can be expressed as in Equation 4, and the aspherical shape of the test surface can be obtained. Besides above, information regarding an aspherical shape may be obtained directly, or the change in radius of curvature at each point or information regarding the gradient of differentiation of the shape may be received directly.

$$z = \frac{cr^2}{1+\sqrt{1-(K+1)c^2r^2}} + \quad \text{(Equation 4)}$$
$$A_4 r^4 + A_6 r^6 + A_8 r^8 + A_{10} r^{10} + \ldots$$
$$c: \frac{1}{R_0}$$

$K$: conic coefficient $A_4, A_6, A_8, A_{10} \ldots$: aspherical coefficient

If no design value is available, an aspherical shape may be calculated by measuring at least a portion of the test surface. This measurement is not measurement for calculating the shape of the entire test surface but is measurement for acquiring information regarding the shape of the test surface and determining the resolution settings for divisional measurement on the entire test surface. Therefore, it is assumed that the measurement of a portion of the test surface is performed prior to the measurement of the entire surface.

Figure 8A:
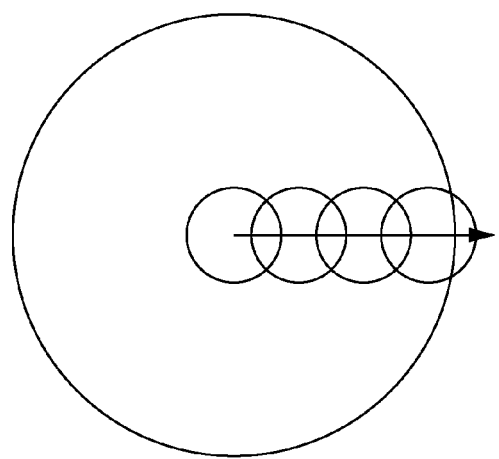
FIG. 8A is a diagram explaining a method for measuring a portion of a test surface in advance.
Figure 8B:
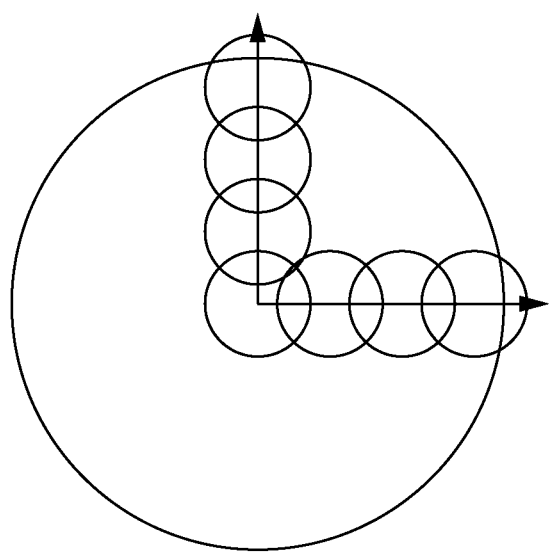
FIG. 8B is a diagram explaining a method for measuring a portion of a test surface in advance.

For example, if the test surface has a shape with rotational symmetry, as in FIG. 8A, measurement may be performed in the radial direction, starting from the center of the test surface, and an aspherical shape in the radial direction may be determined. If the test surface is toric, as in FIG. 8B, measurement may be performed in two directions, starting from the center to the edge of the test surface, and aspherical shapes in the two directions may be determined. That is, the shape of the test surface can be estimated by measuring at least a portion of the test surface in advance.

Specifically, a portion of the test surface may be measured at the highest resolution in the manner described above to obtain shape information, and a resolution at which the test surface is to be measured may be determined from the measurement result. Alternatively, the operation of performing measurement on one certain measurement range with a plurality of different resolutions and calculating an optimum resolution may be repeatedly performed, and an optimum resolution may be determined for each of all the measurement ranges in a range from the center to the edge. In this manner, the shape of the test surface may be calculated by measuring at least a portion of the test surface, and an optimum resolution for each measurement range may be determined when the entire test surface is measured.

Next, a technique for setting an optimum resolution from an obtained aspherical shape will be described.

Figure 9A:
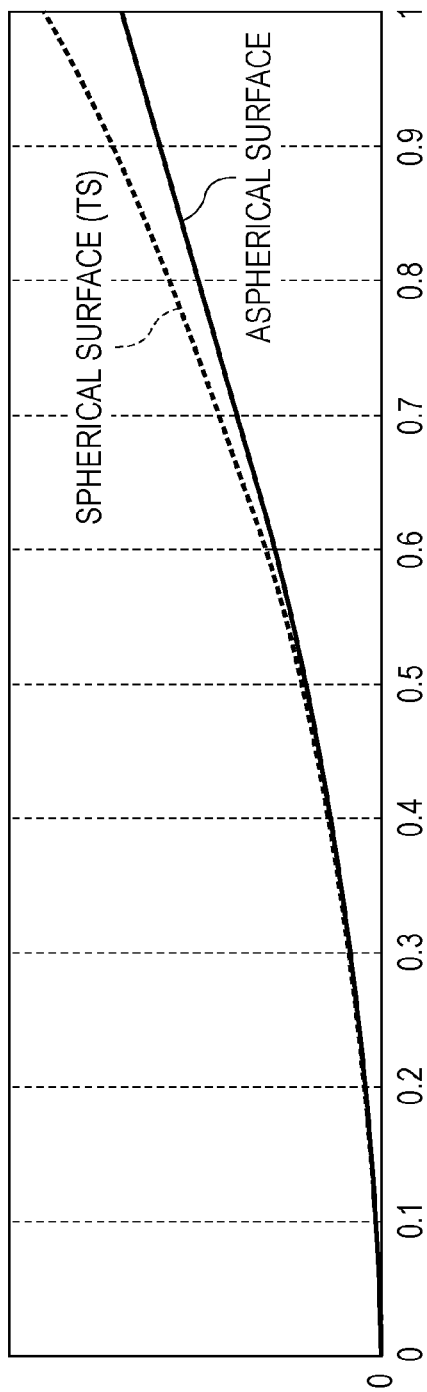
FIG. 9A is a diagram explaining the shape of a test surface and interference fringes.

With a design value or the partial measurement described above, it is found out that the aspherical shape of the test surface is an aspherical shape illustrated in FIG. 9A. Here, an aspherical surface with rotational symmetry is assumed. In FIG. 9A, the aspherical shape from the center portion to the peripheral portion (from 0 to 1) is illustrated. A spherical wave having a curvature that matches the radius of curvature of the center portion (0) is represented by spherical surface (TS) in FIG. 9A. This spherical wave is obtained by the TS lens 7 that generates a reference spherical wave. Difference information between the aspherical surface and the spherical surface (TS) is illustrated in FIG. 9B. Interference fringes are formed on the sensor 6 on the basis of the difference information. Interference fringes that are expected to be formed on the entire test surface are illustrated in FIG. 9C.

As is also apparent from FIG. 9C, due to the small difference between the aspherical surface and the spherical surface, the pitch of the interference fringes is very rough near the center. It can be found out that as one goes from the center to the edge, the difference between the aspherical surface and the spherical surface increases, leading to a reduction in the pitch of the interference fringes. When sub-regions based on the degree of the pitch of the interference fringes are represented by arrows in FIG. 9C, it can be found out that a large region lies in the central portion while smaller regions lie in regions that are closer to the peripheral portion.

In general, in terms of the sampling theorem, two or more pixels per cycle are required to measure interference fringes. However, the measurement with three to five pixels per cycle would obtain more accurate information. Further, measurement ranges and resolutions during measurement can be determined in accordance with the pitch or number of interference fringes.

However, divisional measurement of the entire test surface with the increased number of measurement ranges or resolution conditions would require an increase in the number of system errors to be measured, and the measurement time may be increased. To address such concern, measurement ranges and resolutions may be determined by integrating them into several groups so that the number of measurement ranges and the number of types of resolutions can be reduced as much as possible.

In the above manner, the pitch of interference fringes to be measured is assumed on the basis of the aspherical shape obtained from a design value or partial measurement data. Then, measurement ranges and resolutions can be determined so as to ensure resolutions to be measured. By determining measurement ranges, a stage control method can also be determined and the arrangement (lattice design) of measurement ranges such as how to perform divisional measurement on the entire test surface can also be determined.

Furthermore, with the use of the technology called "Sub-Nyquist interferometry", interference fringes per cycle can be measured at the sampling pitch or less (for example, approximately 0.25 to 2 pixels). The details of "Sub-Nyquist interferometry" are described by Daniel Malacara in "Optical Shop Testing". The "Sub-Nyquist interferometry" technology is a technology that, because of being used with the phase shift method, enables measurement of a large wavefront slope in addition to maintaining the accuracy in the phase shift method. In the normal phase shift method, in phase calculation, calculation is performed by unwrapping (connecting) a phase jump of $2\pi$, whereas in "Sub-Nyquist interferometry", even a wavefront having a large slope can be measured by assuming a phase of $2\pi \times n$ and estimating n. That is, even an aspherical wavefront that has an aspherical shape with a large amount of departure from a spherical surface and that cannot be measured using only the normal phase shift method can be measured. That is, with the use of the Sub-Nyquist interferometry technology, high-resolution measurement can be performed with a smaller number of pixels than usual. In other words, when measurement is performed with the same number of pixels, a larger region than usual can be measured once even if the interferometer pitch is very small and dense. Therefore, divisional measurement of the entire test surface can be achieved with a smaller number of times than usual without reducing the accuracy. The term unwrapping means that phases are stitched together and connected if a phase jump occurs between adjacent points. Generally, the unwrapping process is often performed using the flood fill method.

Figure 10:
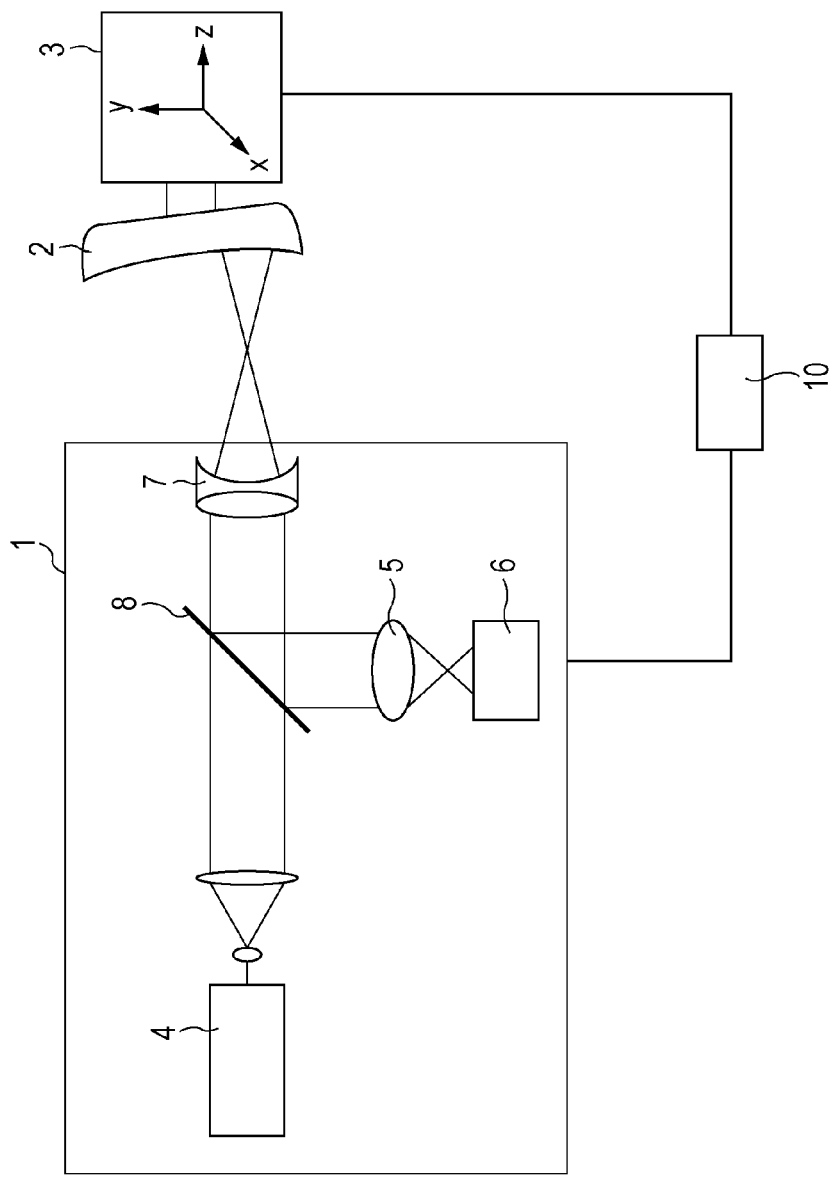
FIG. 10 is a diagram illustrating the arrangement of a test object that is inclined.
Figure 11A:
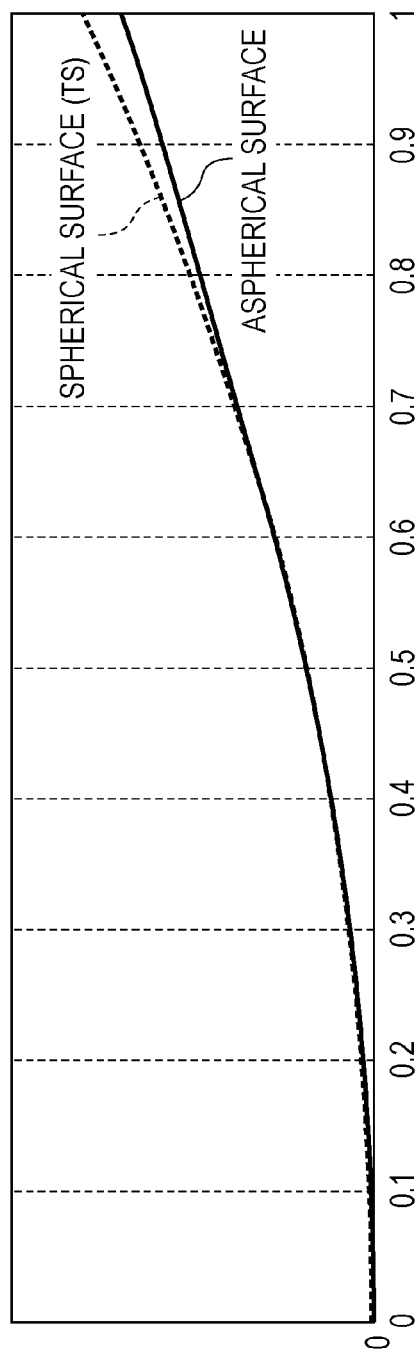
FIG. 11A is a diagram explaining the shape of a test surface and interference fringes.
Figure 11C:
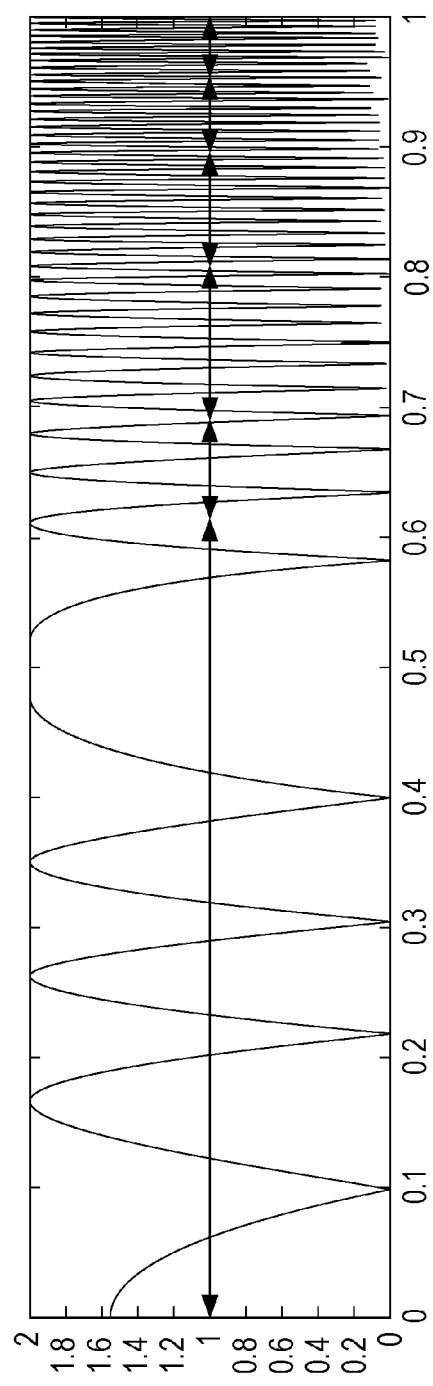
FIG. 11C is a diagram explaining the shape of a test surface and interference fringes.

FIG. 10 illustrates a configuration in which a test object is driven by a stage and is arranged so that the normal to the test surface and the optical axis of a light flux emitted from an interferometer can match. In FIG. 10, the normal to an intermediate portion of the test surface and the optical axis match. With a design value or partial measurement, it is found out that the aspherical shape of the test surface is an aspherical shape as illustrated in FIG. 11A. Here, an aspherical surface with rotational symmetry is assumed. In FIG. 11A, the aspherical shape from the center to the peripheral portion is illustrated. A spherical wave having a curvature that matches the radius of curvature at the position (0.5) of the intermediate portion of the aspherical shape is represented by spherical surface (TS) in FIG. 11A. This spherical wave is obtained by the TS lens 7 that generates a reference spherical wave. FIG. 11B illustrates difference information between the aspherical surface and the spherical surface. Interference fringes on the entire test surface are illustrated in FIG. 11C. It can be found out that the pitch of the interference fringes varies in accordance with the difference from the spherical surface.

When sub-regions based on the degree of the pitch of the interference fringes are represented by arrows in FIG. 11C, six sub-regions are obtained. Compared with FIG. 9C, seven regions are obtained in FIG. 9C. Therefore, it is found out that the number of times measurement in the radial direction is to be performed can be reduced in FIG. 11C. That is, the driving of the test object by using the stage so that the normal to the test surface and the optical axis can match, as in FIG. 10, can require a smaller number of times measurement is to be performed, and can reduce the measurement load in terms of measurement time, data processing time, and the like.

Accordingly, as compared with this embodiment, conventionally, all measurement ranges have the same dimensions, all the diameters of light fluxes projected onto an image pickup element also have the same dimensions, and the highest resolution among resolutions necessary for measurement is set for the respective measurement ranges. Thus, each measurement range has a region to be measured at a high resolution more than necessary, resulting in problems of increased number of times measurement is to be performed and increased measurement time. Furthermore, as the number of times measurement is to be performed increases, the amount of measurement data also increases, resulting in an increase in the time required for the stitching process. Additionally, the number of error factors attributable to the interferometer also increases.

In contrast, according to this embodiment, the time from measurement to the calculation of the shape of the entire test surface can be reduced. Specifically, a measurement range sufficient to be measured at a low resolution can be made larger than conventional, thus enabling a reduction in the number of times measurement is to be performed or a reduction in the measurement time. Furthermore, a reduction in the amount of data can reduce the time required for stitching. Additionally, since the number of times measurement is to be performed (measurement time) is reduced, the influence on measurement errors of the measurement apparatus, which is caused by the measurement for the respective measurement ranges, can also be reduced.

The measurement apparatus described above may determine not only the shape of the test surface as a measurement result but also the wavefront (test wavefront) of light transmitted through or reflected by the test surface as a measurement result.

Figure 3B:
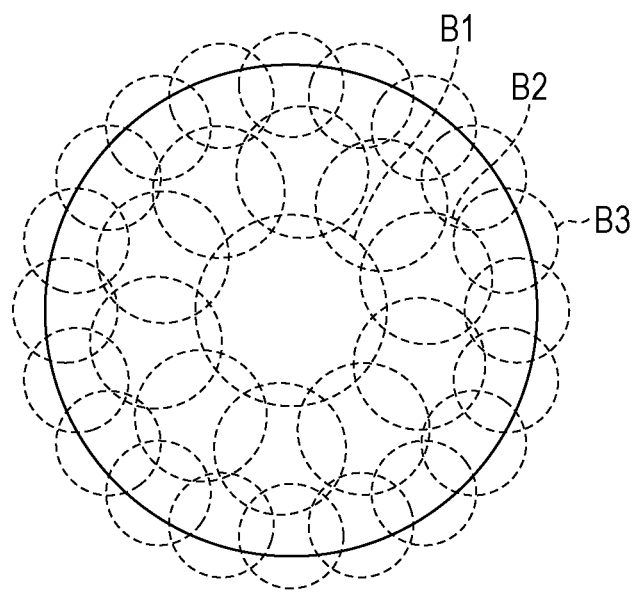
FIG. 3B is a diagram illustrating measurement ranges.

While the description has been given of the measurement of two regions using two types of resolutions, the measurement of more regions using three or more types of resolutions would achieve a similar effect. That is, measurement may be performed using at least two types of resolutions. For example, individual measurement ranges can also be set in a manner as illustrated in FIG. 3B. Three types of measurement ranges are used, where a measurement range B1 is the largest and the size of measurement ranges decreases in the order of B2 and B3. The number of measurement ranges B2 is 10 and the number of measurement ranges B3 is 20. By changing measurement ranges to the measurement ranges B1, B2, and B3, B1, B2, and B3 can be measured at different resolutions.
(Embodiment 2)

In this embodiment, resolutions are changed by setting pixels used for photographing performed by an image pickup element.

Figure 12:
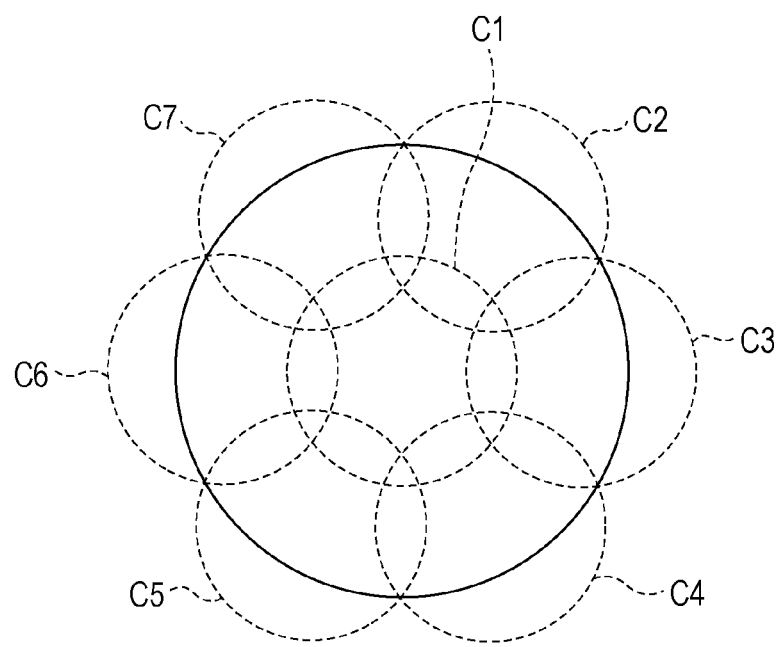
FIG. 12 is a diagram illustrating measurement ranges according to Embodiment 2.

Measurement ranges on a test surface will be described with reference to FIG. 12. The thick line illustrated in FIG. 12 represents the outer periphery of the test surface, and dotted line circles C1 to C7 represent respective measurement ranges. In this example, the test surface is divided into seven measurement ranges and is measured. Each of C1 to C7 partially overlaps at least another measurement range, and an overlap region is formed. The regions (areas or diameters) of C1 to C7 are the same.

In FIG. 12, the test object is an aspherical shaped lens with rotational symmetry, and it is assumed that the region C1 (central portion) has a different amount of asphericity from the regions C2 to C7 (peripheral portions) while all the regions C2 to C7 have an equal amount of asphericity. Thus, the center portion, i.e., C1 (first measurement range), and the peripheral portions, i.e., C2 to C8 (second measurement range), are measured at different resolutions. If the peripheral portions have a larger amount of asphericity than the central portion, the pitch of interference fringes to be measured in the peripheral portions is made smaller (the number of interference fringes is made larger). If the number of interference fringes is large, photographing is performed at a higher resolution. On the other hand, in the central portion where the number of interference fringes is small, it is not necessary to read data at intervals as short as the peripheral portions. Thus, low-resolution measurement is performed for the central portion.

Examples of methods for changing a resolution include a method for changing the number of pixels used for photographing performed by an image pickup element while fixing the dimensions of measurement half ranges on the test surface. The number of pixels used for low-resolution measurement is reduced, and the number of pixels used for high-resolution measurement is increased.

Another technique is to make the number of pixels used for photographing the same and to change the number of pixels for which electrical signals are to be read (pixels for which electrical signals are to be output to a control unit) among all the pixels of a CCD, which is an image pickup element, while fixing the dimensions of measurement ranges on the test surface. The number of pixels to be read is reduced for low-resolution measurement, and the number of pixels to be read is increased for high-resolution measurement.

Specifically, if a CCD having 2048 pixels×2048 pixels is used, the peripheral portions are measured by projecting interference fringes onto 2048×2048 pixels, so that the measurement is performed at as high a resolution as 2048×2048 pixels. On the other hand, the center portion is measured by reducing the diameters of light fluxes falling onto the CCD and projecting interference fringes onto 512×512 pixels, so that the measurement is performed at as low a resolution as 512×512 pixels. Here, since the respective measurement ranges for C1 to C7 also have the same dimensions, the measurement pitch is coarse in the center portion and fine in the peripheral portion on the test surface.

The resolutions are set by, for example, the control unit sending a command specifying the number of pixels to be used for photographing to the sensor 6 or sending a command specifying the number of pixels to be read to the sensor 6.

The diameters of light fluxes on the light receiving surface of the sensor can be changed by, for example, causing the lens 5 to move in the optical axis direction. Changing the arrangement position of the lens 5 allows the diameters of light fluxes on the CCD to be changed, and resolutions can be changed by reading signals corresponding to the number of pixels corresponding to the diameters of light fluxes. The lens 5 may not necessary be a single lens but may be constructed by a plurality of lenses.

The method of Embodiment 1 may also be combined to change resolutions. Specifically, the resolution of measurement of the center portion C1 can be made lower than that of the peripheral portion by making the dimensions of the center portion C1 larger than those of the peripheral portions while reducing the diameters of light fluxes on the CCD.

According to this embodiment, high-resolution measurement is performed only for a region that requires high resolution by increasing the number of pixels to be read, and low-resolution measurement is performed for other regions. This can reduce the size of the measurement data, and can therefore reduce the time required for the arithmetic process for stitching.

(Embodiment 3)

In this embodiment, binning conditions under which a CCD reads signals of pixels are changed. Binning is a function for combining several adjacent pixels on a CCD into a group to virtually increase the area of a light receiving surface so that the electrical signals can be amplified and detected. Binning allows the same effect as when the number of pixels is reduced to be obtained. Binning is generally represented as, for example, 1×1, 2×2, 3×3, . . . Binning 1×1 means that each pixel is used as it is. Binning 2×2 means that a pixel region of 2 pixels×2 pixels=4 pixels is integrated into one large pixel. Here, since the pixel size is increased to be four times the original, the sensitivity to light also becomes four times the original but the resolution becomes half the original. Therefore, if a 2048×2048 CCD is used, 2×2 binning provides 1024×1024 pixel resolution, resulting in low-resolution measurement.

According to this embodiment, high-resolution measurement is performed only for a region that requires high resolution by increasing the number of pixels to be read, and low-resolution measurement is performed for other regions. This can reduce the size of the measurement data, and can therefore reduce the time required for the arithmetic process for stitching.

The method for setting resolutions of an image pickup element is not limited to the number of pixels or binning conditions as long as resolutions can be changed. That is, while binning conditions are changed, the dimensions of measurement ranges and the dimensions of the diameters of light fluxes on the CCD may be maintained constant or may be changed as in Embodiment 2. Furthermore, the above method may be combined with the method as in Embodiment 1 for changing resolutions by changing the dimensions of measurement ranges.

(Embodiment 4)

In this embodiment, interference fringes are detected (photographed) in all measurement ranges at a high resolution, and data processing for reducing a resolution is performed on measurement data for some measurement ranges to perform measurement at different resolutions. Examples of the data processing for reducing a resolution include a process for decimating measurement data.

It is assumed that a test surface and measurement ranges are the same as those in Embodiment 2. It is necessary to measure the peripheral portions at a high resolution, and it is sufficient to measure the central portion at a low resolution. Thus, interference fringes are detected in all the regions C1 to C7 illustrated in FIG. 12 at a high resolution, and data processing for reducing a resolution is performed on the measurement data for the central portion C1.

In this embodiment, in the measurement flow illustrated in FIG. 2, for example, data processing for reducing a resolution is performed on the measurement data for the central portion C1 after S122 and before S13. The measurement data for the peripheral portions C2 to C7 is stored as it is without changing the resolution. Here, data processing for reducing a resolution may be performed on data of interference fringes or data of the shape of the test surface.

The amount of decimation may be determined using a design value of the shape of the test surface, or may be determined using a result of measuring the shape of a portion of the test surface in advance.

According to this embodiment, the amount of data required for the arithmetic process for stitching can be reduced by performing a resolution reduction process so that a resolution set for each measurement range can be obtained, and the time for the arithmetic operation can be reduced.

Examples of methods for changing a resolution may include a combination of this embodiment and at least one of the embodiments described above.

(Embodiment 5)

Figure 13A:
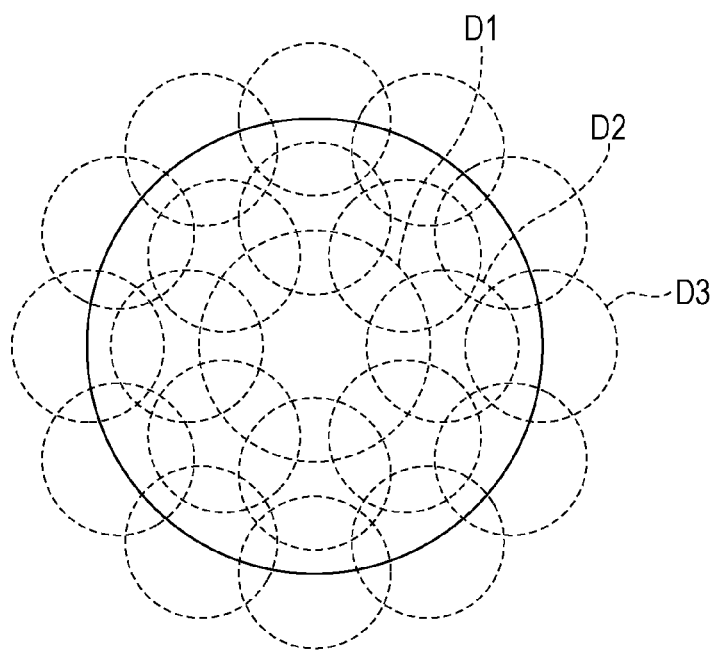
FIG. 13A is a diagram illustrating measurement ranges according to Embodiment 5.

In this embodiment, an example in which a pixel shift process is added as a method for changing a resolution will be described. FIG. 13A illustrates measurement ranges on a test surface. The thick line illustrated in FIG. 13A represents the outer periphery of the test surface, and dotted line circles D1, D2, and D3 represent respective measurement ranges. Three types of measurement ranges are used, where D1 is the largest. D2 is set along the outer periphery of D1, and D3 is set along the outer periphery of D2. If the test surface is an aspherical surface with rotational symmetry and has a larger amount of asphericity in the peripheral portions than in the central portion, it is desirable that D3 be measured at a higher resolution than D2. In this case, a special process is additionally performed only for the measurement ranges of D3, which are required to be measured at a high resolution. Here, an example in which a pixel shift process is added as a special process will be described.

In order to perform a pixel shift process, a configuration is provided in which, for example, a CCD of all pixel readout type is used so that information regarding all the pixels can be acquired. Then, information on pixels is acquired by changing relative positions of the CCD light receiving surface and measurement ranges on the test surface to be less than or equal to the pixel size of the CCD within or around, for example, the ranges of D3. The relative positions of the CCD and the measurement ranges may be changed by driving the CCD in the XY direction (direction perpendicular to the optical axis) with respect to the measurement ranges (applied light fluxes) or by driving the measurement ranges in the XY direction with respect to the CCD.

Figure 13B:
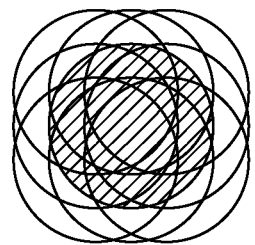
FIG. 13B is a diagram illustrating measurement ranges that are shifted by an amount less than or equal to the pixel size.

FIG. 13B illustrates nine images acquired while relative positions of the CCD and measurement ranges are changed with respect to a shaded region so as to be less than or equal to the pixel size of the CCD. For example, in the case of a CCD having a pixel size of 9 um, the change by a pitch of 3 um makes it possible to read information on pixels, and an image with the number of pixels nine times the number of pixels of the CCD itself can be created. In this manner, a plurality of images are acquired with changing relative positions of the CCD and the measurement ranges to be less than or equal to the pixel size of the CCD, and are subjected to a combining process. Thus, resolution can be improved. Therefore, an image shift process performed for only a measurement range that requires high resolution enables high-resolution measurement even if the resolution of the CCD is insufficient.

Examples of methods for changing a resolution may include a combination of this embodiment and at least one of the embodiments described above.

In the foregoing embodiments, the description has been given of examples where an interferometer is used as a measurement apparatus. However, the embodiments are not exhaustive, and an interferometer may not necessarily be used. An apparatus capable of acquiring the shape of a test surface or the shape of the test wavefront without using interference, such as a Hartman sensor, would achieve a similar effect. When a Hartman sensor is used, a TS lens is not needed. In addition, the present invention can also be applied to an apparatus capable of measuring the shape of the test surface through contact-type measurement. Also in a contact-type shape measurement apparatus, a resolution can be defined as the number of measurement points (the number of pieces of data) per unit length of the test surface, and a similar effect is achieved.

Furthermore, the description has been mainly given of the case where an aspherical shape is measured, by way of example. However, the present invention is not limited to the measurement of an aspherical shape, and can also be adapted to the measurement of the shape of a planar surface, a spherical surface, or a free-form surface. The present invention can also be applied to the case where wavefronts of light from the test surface are measured and stitched together to calculate the wavefront of light from the entire test surface.

Furthermore, as described above, an optical element can be manufactured by measuring the shape of the test surface of the optical element or the wavefront of light from the test surface, and processing, by a processing machine, the shape of the test surface using the measurement data.

The present invention is not intended to be limited to the above embodiments, and a variety of changes and modifications can be made without departing from the spirit and scope of the present invention. Therefore, the claims which follow are appended in order to clearly define the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2010/061940, filed Jul. 15, 2010, which is hereby incorporated by reference herein in its entirety.

What is claimed is:

1. A measurement method for measuring a shape of a test surface using an optical system, the measurement method comprising:
   a step of setting each of a plurality of measurement ranges so that a portion of the test surface is used as one measurement range and one measurement range overlaps a portion of at least another measurement range to form an overlap region;
   a step of measuring a shape of the test surface in each of the plurality of measurement ranges; and
   a step of obtaining a shape of the test surface over the plurality of measurement ranges by stitching together pieces of data of the shapes of the test surface obtained in the measuring step,
   wherein the measuring step includes
   a step of measuring a shape of the test surface in a first measurement range among the plurality of measurement ranges at a first resolution, and
   a step of measuring a shape of the test surface in a second measurement range different from the first measurement range among the plurality of measurement ranges at a second resolution different from the first resolution, and
   wherein the first resolution and the second resolution are made different from each other by changing characteristics of the optical system.

2. The measurement method according to claim 1, wherein a system error attributable to the optical system differs between the first measurement range and the second measurement range, and wherein the shape of the test surface over the plurality of measurement ranges is calculated using a system error corresponding to each of the first measurement range and the second measurement range.

3. The measurement method according to claim 1, wherein the first resolution and the second resolution are made different from each other by making different from each other the dimensions of the first measurement range and the dimensions of the second measurement range.

4. The measurement method according to claim 1, wherein the first resolution and the second resolution are made different from each other by making different from each other the numbers of pixels that are used in measurement performed by an image pickup element used to measure the shapes of the test surface in the first and second measurement ranges.

5. The measurement method according to claim 1, wherein the first resolution and the second resolution are made different from each other by measuring the shape of the test surface while moving a measurement range at a pitch less than or equal to a pixel size of an image pickup element used to measure the shape of the test surface in the first measurement range or the second measurement range.

6. The measurement method according to claim 1, wherein the first resolution and the second resolution are set using a design value of the shape of the test surface.

7. The measurement method according to claim 1, wherein a shape of the test surface is measured in advance for at least a portion of the test surface, and the first resolution and the second resolution are set using data obtained through the measurement.

8. The measurement method according to claim 1, wherein the test surface has a larger amount of asphericity in the first measurement range than an amount of asphericity in the second measurement range, and wherein the first resolution is higher than the second resolution.

9. The measurement method according to claim 3, wherein the test surface has a larger amount of asphericity in the first measurement range than an amount of asphericity in the second measurement range, and wherein the first measurement range is smaller than the second measurement range.

10. The measurement method according to claim 4, wherein the test surface has a larger amount of asphericity in the first measurement range than an amount of asphericity in the second measurement range, and
wherein the number of pixels used for measurement in the first measurement range is larger than the number of pixels used for measurement in the second measurement range.

11. The measurement method according to claim 1, wherein the first resolution and the second resolution are made different from each other by changing a magnification of the optical system.

12. The measurement method according to claim 1, wherein the first resolution and the second resolution are made different from each other by changing a diameter of a light flux incident on the test surface by using the optical system.

13. The measurement method according to claim 1, wherein the first resolution and the second resolution are made different from each other by changing a numerical aperture of a light flux incident on the test surface by using the optical system.

14. The measurement method according to claim 1, wherein the optical system causes test light from the test surface and reference light to interfere with each other, and wherein the optical system has a plurality of lenses that generate different reference lights, and wherein the first resolution and the second resolution are made different from each other by switching between the plurality of lenses and arranging a lens in an optical path.

15. The measurement method according to claim 1, wherein the optical system has an aperture stop having an aperture whose diameter is variable, and wherein the first resolution and the second resolution are made different from each other by changing the aperture diameter of the aperture stop.

16. A method for manufacturing an optical element, comprising:
a measuring step of measuring a shape of a test surface of an optical element or a wavefront of light from the test surface using the measurement method according to claim 1; and
a step of processing the shape of the test surface using data of the shape of the test surface or the wavefront of light from the test surface obtained in the measuring step.

17. A measurement apparatus that sets each of a plurality of measurement ranges so that a portion of a test surface is used as one measurement range and one measurement range overlaps a portion of at least another measurement range to form an overlap region, and that measures a shape of the test surface using the plurality of measurement ranges, the measurement apparatus comprising:
a detector;
an optical system that guides light to the test surface and guides light including light reflected by the text surface to the detector; and
a calculation unit that calculates a shape of the test surface over the plurality of measurement ranges by stitching together pieces of data of the shapes of the test surface measured in the plurality of respective measurement ranges using the detector,
wherein a shape of the test surface in a first measurement range among the plurality of measurement ranges is measured at a first resolution, and a shape of the test surface in a second measurement range different from the first measurement range among the plurality of measurement ranges is measured at a second resolution different from the first resolution, and
wherein the first resolution and the second resolution are made different from each other by changing characteristics of the optical system.

* * * * *